(12) United States Patent
Newman et al.

(10) Patent No.: US 11,388,916 B2
(45) Date of Patent: Jul. 19, 2022

(54) DEGASSING APPARATUS FOR CRYOGENIC COOLING SYSTEM, CRYOGENIC COOLING SYSTEM, AND METHOD FOR COOLING LIQUID PRODUCTS

(71) Applicant: Messer Industries USA, Inc., Bridgewater, NJ (US)

(72) Inventors: Michael D. Newman, Hillborough, NJ (US); Stephen McCormick, Warrington, PA (US)

(73) Assignee: Messer Industries USA, Inc., Wilmington, DE (US)

( * ) Notice: Subject to any disclaimer, the term of this patent is extended or adjusted under 35 U.S.C. 154(b) by 0 days.

(21) Appl. No.: 15/290,998

(22) Filed: Oct. 11, 2016

(65) Prior Publication Data
US 2018/0098561 A1 Apr. 12, 2018

(51) Int. Cl.
*B01D 9/00* (2006.01)
*A23L 3/375* (2006.01)
*F25D 3/10* (2006.01)

(52) U.S. Cl.
CPC .............. *A23L 3/375* (2013.01); *B01D 9/00* (2013.01); *B01D 9/0036* (2013.01); *B01D 9/0063* (2013.01); *F25D 3/10* (2013.01); *B01D 2311/2653* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,376,221 A | * | 5/1945 | Baker | B01D 19/0078 95/30 |
| 3,242,643 A | * | 3/1966 | Moore | B01D 19/0036 95/249 |
| 3,713,274 A | * | 1/1973 | Sauer | B01D 19/0042 96/157 |
| 3,793,805 A | | 2/1974 | Hoffman | |
| 4,343,630 A | | 8/1982 | Grant | |
| 4,443,334 A | * | 4/1984 | Shugarman | B01D 35/185 196/115 |
| 2016/0199756 A1 | | 7/2016 | Saint-Vincent | |
| 2016/0270433 A1 | * | 9/2016 | Lilakos | A23L 3/375 |

OTHER PUBLICATIONS

International Search Report for PCT/US2017/43255, dated Nov. 27, 2017, Authorized Officer: Lee W. Young, 13 pgs.
Written Opinion of International Searching Authority for PCT/US2017/43255, dated Nov. 27, 2017, Authorized Officer: Lee W. Young, 5 pgs.

* cited by examiner

*Primary Examiner* — Brian M King
(74) *Attorney, Agent, or Firm* — Joshua L. Cohen

(57) ABSTRACT

Provided is a degassing apparatus having a fluid flow surface positioned within a tank and configured for decreasing the velocity of the fluid flowing through the tank; a cryogen fluid cooling system including the degassing apparatus positioned in fluid communication with a cryogen injector of the system; and a direct cryogen fluid cooling method including flowing fluid containing cryogen into a degassing apparatus for decreasing a velocity of and for removing cryogen gas from the flowing fluid.

3 Claims, 5 Drawing Sheets

DEGASSING APPARATUS FOR CRYOGENIC COOLING SYSTEM, CRYOGENIC COOLING SYSTEM, AND METHOD FOR COOLING LIQUID PRODUCTS

BACKGROUND

The present embodiments relate to a degassing apparatus for use in a system and method for direct cryogenic cooling to rapidly reduce the temperature of liquid products such as, without limitation, in the food processing and preparation industries.

In the food industry hot liquid sauces are cooled by a direct in-line cooling process using a liquid cryogen such as for example liquid nitrogen. According to known direct in-line cooling processes, the hot sauce product to be cooled is flowed through a pipeline. The liquid cryogen is introduced into the pipeline at a desired location and directly contacts the hot flowing sauce product to cool it.

One problem associated with the use of a liquid cryogen for direct in-line sauce cooling is the immediate conversion of cryogen from a liquid to gas within the pipeline. The rapid expansion of the cryogenic gas accelerates the flow of the liquid through the pipeline and may also damage the sauce product. The cryogenic gas is also an asphyxiant and must be removed from the sauce product prior to packaging.

Known direct in-line cryogenic sauce cooling methods and systems therefore require a second cooling kettle to further cool the heated sauce and to remove the cryogenic gas from the cooled sauce product. The sauce is transferred into the second kettle at atmospheric pressure, the cryogenic gas is exhausted from the second kettle, and only then may the sauce be pumped into product packaging.

SUMMARY

The present embodiments provide a degassing apparatus for a cryogenic fluid cooling system comprising a tank having an interior, a fluid inlet, a fluid outlet, and an exhaust gas outlet; a tank pressure control valve in communication with the interior of the tank and the exhaust gas outlet; a fluid level sensor in communication with the interior of the tank and the pressure control valve; and a fluid flow surface positioned within the interior of the tank configured to decrease the velocity of the fluid flowing through the tank. The method and system incorporating the degassing apparatus can be used to rapidly reduce the temperature of liquid food products such as, without limitation, sauces, soups, marinades, dairy or other heated or pasteurized liquids.

The present embodiments also provide a cryogenic fluid cooling system comprising a tank configured to contain a source of heated fluid to be cooled; a pipeline in fluid communication with the source of heated fluid; means for conveying the fluid to be cooled through the cryogenic cooling system; a source of cryogen; a cryogen injector in fluid communication with the pipeline; and a degassing apparatus positioned downstream from the cryogen injector, and in fluid communication with the cryogen injector. The degassing apparatus of the direct cryogen cooling system comprises a tank having an interior, a fluid inlet, a fluid outlet, and an exhaust gas outlet; a tank pressure control valve in communication with the interior of the tank and the exhaust gas outlet; a fluid level sensor in communication with the interior of the tank and the pressure control valve; and a fluid flow surface positioned within the interior of the tank configured to decrease the velocity of the fluid flowing through the tank.

The present embodiments further provide a direct cryogenic fluid cooling method comprising flowing fluid to be cooled through a pipeline; introducing a cryogen into the fluid by a cryogen injector; flowing the fluid containing cryogen into a degassing apparatus positioned downstream from the cryogen injector; exhausting cryogen gas from the degassing apparatus through an exhaust outlet; and flowing the fluid from the degassing apparatus through a product outlet. The degassing apparatus used in the direct cryogen cooling method comprises a tank having an interior, a fluid inlet, a fluid outlet, and an exhaust gas outlet; a tank pressure control valve in communication with the interior of the tank and the exhaust gas outlet; a fluid level sensor in communication with the interior of the tank and the pressure control valve; and a fluid flow surface positioned within the interior of the tank configured to decrease the velocity of the fluid flowing through the tank.

BRIEF DESCRIPTION OF THE DRAWINGS

The accompanying drawings are included to provide a further understanding of the apparatus, system and process provided herein and are incorporated in and constitute a part of this specification. The drawings illustrate embodiments of the apparatus, system and method provided herein and, together with the description, serve to explain the principles described herein but are not intended to limit the specification or any of the claims.

DETAILED DESCRIPTION OF THE ILLUSTRATIVE EMBODIMENTS

Figure 1:
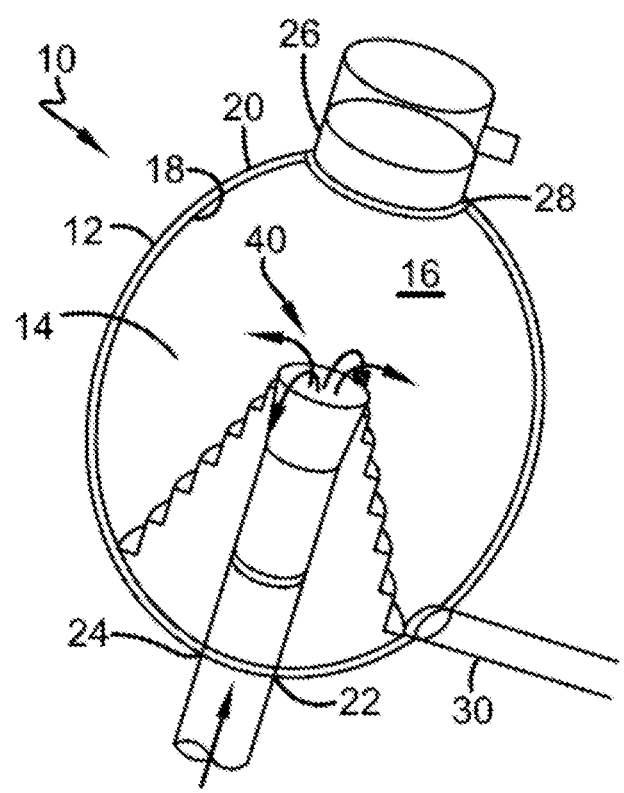
FIG. 1 is a cut-away perspective view of an illustrative embodiment of the degassing apparatus.

Provided herein is a degassing apparatus for cryogen fluid cooling system for cooling liquid food products such as, without limitation, sauces, soups, marinades, dairy or other heated or pasteurized liquids. The degassing apparatus may be for a direct in-line cryogen fluid cooling system for cooling liquid food products. The degassing apparatus includes a tank defining an interior cavity that is configured to accept fluids flowing into the degassing apparatus for the removal of cryogen gases that were generated during the direct cryogen cooling process. The tank of the degassing apparatus includes a fluid inlet for injecting flowing fluid into the interior of the tank of the apparatus. The tank of the degassing apparatus also includes a fluid outlet for flowing fluid from the interior of the tank to a location that is external to the interior of the tank. The tank further includes an exhaust gas outlet for exhausting or otherwise removing cryogen gas from the interior of the degassing apparatus that has accumulated from the flow of the fluid being cooled through the degassing apparatus.

The tank of the degassing apparatus includes a pressure control valve that is in communication with the interior of the tank and with the exhaust gas outlet. A fluid level sensor is provided in communication with the interior of the tank and the pressure control valve for the purpose of measuring the level of the fluid within the interior of the tank of the degassing apparatus and maintaining a selected level of the fluid within the interior of the tank. According to certain illustrative embodiments, the fluid sensor measures the level of fluid within the interior of the tank and communicates with the pressure control valve to maintain the selected fluid level, which may be a substantially constant fluid level within the interior of the tank of the degassing apparatus.

The fluid inlet of the tank is located at the upstream end of the tank. Positioned within the interior of the tank of the degassing apparatus and in-line with the fluid inlet of the tank is a fluid flow surface. The fluid flow surface is configured to decrease the velocity of the fluid flowing through the tank. Decreasing the velocity of the fluid flow through the interior of the tank results in increasing the residence time of the fluid within the interior of the tank and exposing more surface area of the flowing fluid within the interior of the tank. Decreasing the velocity of the fluid flowing through the degassing apparatus results in more cryogen being removed from the fluid and being exhausted from the process through the gas exhaust outlet of the tank of the degasser. The use of a fluid flow surface within the interior of the tank of the degassing apparatus permits the in-line cryogenic cooling process to be operated at a desired fluid flow rate, while at the same time reducing the velocity of the fluid so that the generated cryogen gas can be separated from the fluid and exhausted from the process. The use of the degassing apparatus having the fluid flow surfaces permits velocity reduction of the fluid at any desired fluid flow rate by increasing the cross-sectional flow area for the flowing fluid.

Any suitably shaped fluid flow surface may be located within the interior of the tank of the apparatus, provided the velocity of the fluid flowing over the fluid flow surface within the interior the tank is decreased to expose more surface area of the fluid to the interior of the tank, and to increase the residence time of the fluid within the interior of the tank. According to certain illustrative embodiments, a suitable non-limiting fluid flow surface for the interior of the degassing apparatus comprises first and second frusto-conical surfaces. Only by way of illustration, and not limitation, the first frusto-conical surface has opposed top and bottom edges, and the first frusto-conical surface is inverted and extends upwardly and outwardly from the fluid inlet of the tank. The second frusto-conical surface has opposed top and bottom edges, and extends downwardly and outwardly from the top edge of the first frusto-conical surface.

According to further illustrative embodiments, the second frusto-conical surface of the fluid flow surface may be stepped along a portion of the surface from the top edge to the bottom edge of the second frusto-conical surface. According to certain embodiments, the second frusto-conical surface of the fluid flow surface is stepped concentrically substantially from the top to the bottom surface of the second frusto-conical surface.

A fluid collection trough is positioned near or at the upstream end of the tank of the degassing apparatus for collecting fluid flowing along the fluid flow surface. According to certain embodiments, the fluid collection trough is positioned at or near the bottom edge of the second frusto-conical surface and is configured to collect a volume of fluid flowing outwardly and downwardly along the second frusto-conical fluid flow surface.

The tank of the degassing apparatus further includes a fluid outlet for expelling or otherwise removing fluid from the interior of the tank to a remote location external to the interior of the tank. The fluid outlet is in communication with the fluid collection trough and removes fluid collected in the collection trough from the interior of the tank.

The degassing apparatus further includes a fluid level sensor that is in communication with an interior of the tank of the degassing apparatus, the fluid level sensor configured to detect and measure the level of fluid present within the interior of the tank. According to certain illustrative embodiments, the fluid level sensor is positioned at a level between the upstream and downstream ends of the tank to detect and measure the fluid levels within the interior of the tank and to send or transmit a signal to a controller or pressure control valve in order to adjust or maintain selected levels of fluid within the interior of the tank of the degassing apparatus. According to certain illustrative embodiments, the fluid sensor measures the level of fluid within the interior of the tank and communicates with the pressure control valve to maintain the selected fluid level, which may be a substantially constant fluid level within the interior of the tank of the degassing apparatus. According to certain illustrative embodiments, and without limitation, the fluid level sensor is positioned at a level between the fluid collection trough and the top edges of the first and second frusto-conical fluid flow surfaces of the fluid flow surface.

The present embodiments also provide a direct cryogenic fluid cooling system, such as, for example and without limitation, a direct in-line cryogenic fluid cooling system. The cooling system includes a tank that is adapted or configured to contain a source of heated fluid to be cooled. A fluid pipeline is provided in fluid communication with the source tank of liquid product to be cooled and is configured for conveying or flowing fluid to be cooled through the system. The in-line cryogen cooling system also includes means for conveying the fluid to be cooled through the in-line cryogenic cooling system. The system includes a source of cryogen, such cryogen to be injected into the system and for coming into direct contact with the fluid flowing through the system. A cryogen injector may be positioned in-line and in fluid communication with the fluid pipeline. According to certain embodiments, the cryogen injector is positioned in-line and in fluid communication with the fluid pipeline. A degassing apparatus is positioned downstream from the cryogen injector. According to certain embodiments, the degassing apparatus is positioned in-line and downstream from the cryogen injector. The degassing apparatus is in fluid communication with the cryogen injector.

According to certain illustrative embodiments, the degassing apparatus is positioned directly downstream from the cryogen injector. That is, the outlet end of the cryogen injector is directly coupled to the product inlet of the tank of the degassing apparatus. According to alternative illustrative embodiments, a suitable length of product pipeline can be positioned between the outlet end of the cryogen injector and the product inlet of the tank of the degassing apparatus. According to those alternative illustrative embodiments, the cryogen injector is in fluid communication with the interior of the tank of the degassing apparatus via the additional length of pipeline extending between these two components.

The means for conveying or flowing the fluid being cooled through various components of the cooling system may be selected from pumps and controlled valves. According to certain embodiments, the means for flowing the fluid being cooled through the system comprises a pump. According to certain illustrative embodiments, the pump for flowing the fluid being cooled through the system comprises a positive displacement pump.

The cryogenic fluid cooling system employs a source of cryogen. According to the present embodiments, without limitation, and only by way of example, the suitable cryogen for cooling the fluid may be selected from nitrogen, carbon dioxide, and mixtures thereof. The term "cryogen" refers to a cooling substance having a temperature of about −320° F. to about 0° F. prior to being injected into the pipeline and coming into direct contact with the flowing fluid to be cooled. The cryogen can be injected directly into the fluid flowing through the system by a cryogen injector, lance, or one or a plurality of nozzles. The use of the cryogen is an open or direct cooling system and the direct injection step produces a convective interaction between the cold cryogen and the hot fluid or sauce which provides a faster heat transfer at the product and produces a warm cryogen gas. According to certain illustrative embodiments, the cryogen is liquid nitrogen.

According to certain embodiments, the source of cryogen may comprise a container, housing, tank, or vessel that is suitable for holding a quantity of cryogen until it is desired to inject the cryogen into the fluid to be cooled. A cryogen supply pipeline may be positioned between and in fluid communication with the cryogen source and a cryogen injector for the purpose of transferring the cryogen from the cryogen source to the cryogen injector. The flow of cryogen from the cryogen source may be controlled by a controller and controlled valve in order to adjust the flow rate of cryogen from the cryogen source into the fluid to be cooled. According to alternative embodiments, the cryogen source and injector may be configured to inject cryogen into the fluid to be cooled at a substantially constant cryogen injection rate.

The direct cryogen cooling system may also include a suitable collection container for collecting cooled fluid for subsequent processing or product packaging. This container may comprise any container, housing, tank or vessel for collecting and possible storing of a desired quantity of cooled fluid. The collection container is in fluid communication with the fluid product outlet exiting the degassing apparatus of the cooling system. The collection container also includes an inlet for accepting cooled fluid into the interior of the container.

According to certain illustrative embodiments, the product outlet of the degassing apparatus may be directly coupled to the product inlet of the collection container of the system. According to alternative illustrative embodiments, a suitable length of product pipeline can be positioned between the fluid outlet of the degassing apparatus and the fluid inlet of the collection container. According to those alternative illustrative embodiments, the degassing apparatus is in fluid communication with the interior of the tank and the collection container via the additional length of product pipeline extending between these two system components.

The direct cryogen cooling system includes one or a plurality of controllers for controlling the flow rate of the fluid through the system, the flow rate of the cryogen through the system, and/or the pressure within the interior of the tank of the degassing apparatus. Without limitation, and only by way of illustration, the controller may be selected from PI, PD, PID, MPC and Markov-chain controllers. According to certain illustrative embodiments, one or a plurality of PID controllers may be used for controlling the flow rate of the fluid through the system, the flow rate of the cryogen through the system, and/or the pressure within the interior of the tank of the degassing apparatus.

The present embodiments also relate to a direct in-line cryogenic fluid cooling method for cooling fluid products such as fluid food products in the food processing and preparation industries. The method includes flowing fluid to be cooled through a pipeline and exposing the fluid to be cooled to direct contact with a suitable cryogen. The direct contact of the fluid to be cooled with the cryogen results in rapid cooling of fluids such as food products in the food preparation and processing industries. The process includes providing a source of fluid to be cooled. The fluid to be cooled is flowed such as, for example, by pumping the fluid to be cooled through a pipeline. A suitable cryogen is injected directly into the fluid flowing through the pipeline and comes into direct contact with the fluid to cool same. The method and system incorporating the degassing apparatus can be used to rapidly reduce the temperature of liquid food products such as, without limitation, sauces, soups, marinades, dairy or other heated or pasteurized liquids. According to certain illustrative embodiments, the fluid to be cooled by the cooling system comprises a sauce.

According to the method of the present embodiments, a suitable cryogen is injected into the fluid by a cryogen injector that is positioned in fluid communication with the fluid pipeline. According to certain embodiments, suitable cryogen is injected into the fluid by a cryogen injector that is positioned in in-line and in fluid communication with the fluid pipeline. The fluid flowing through the cooling system exits the cryogen injector and enters a degassing apparatus that is positioned in fluid communication with the cryogen injector in order to remove cryogen gas from the fluid being cooled and to exhaust the generated cryogen gas from the system. The cryogen gas removed from the fluid being cooled is exhausted from the cooling system through an exhaust outlet that is in fluid communication with the interior of the tank of the degasser. The fluid from which at least a portion of the cryogen gas is removed is then expelled from the interior of the tank of the degasser through a fluid outlet.

In order to effectively remove cryogen gas from the fluid being cooled by the process, the velocity of the fluid through the degassing apparatus is reduced. According to certain embodiments, the velocity of the fluid being cooled through the interior of the degassing apparatus is reduced by flowing the fluid over a suitable flow surface that is configured or otherwise designed to reduce the velocity of the fluid. Decreasing the velocity of the fluid through the interior of the tank of the degassing apparatus results in increasing the residence time and exposing more surface area of the fluid within the interior of the tank of the degassing apparatus. As the velocity of the fluid decreases, and the residence time and surface area exposure of the fluid increases, more cryogen gas is removed from the flowing fluid and is therefore exhausted from the degassing apparatus.

The velocity of the fluid is reduced by flowing or otherwise passing the fluid being cooled over a suitably shaped flow surface. According to certain illustrative embodiments, the fluid being cooled is passed over a flow surface that comprises first and second frusto-conical surfaces. Only by way of illustration, and not limitation, fluid flowing through the cooling system enters the interior of the degasser tank through the product inlet located at the upstream portion of the tank. The fluid is flowed upwardly and outwardly from the tank inlet along the inner flow surface of the first inverted frusto-conical flow surface.

Once the fluid reaches the top edge of the inverted first frusto-conical flow surface, the flowing fluid changes direction and flows downwardly toward the upstream end of the tank and outwardly from the tank inlet. Thus, the process includes flowing the fluid upwardly and outwardly away from the tank inlet along the first inverted frusto-conical surface and then downwardly and outwardly from the inlet along the second inverted frusto-conical surface. As the fluid flows outwardly and downwardly along the outer surface of the second frusto-conical flow surface, the flow rate of the fluid is further decreased exposing still more surface area of the sauce to the interior of the degasser tank.

According to certain illustration embodiments, the outer surface of the second frusto-conical flow surface is provided with a concentrically stepped configuration from the top edge to the bottom edge of the second frusto-conical flow surface. According to the method, the fluid continues to flow from the second inverted frusto-conical surface into a fluid collector such as a collection trough or tube that is located at the bottom edge of the second frusto-conical flow surface. As the fluid flows over the fluid flow surface, the cross-sectional flow area of the fluid increases which results in a decrease in the velocity of the flow of the fluid within the tank of the degassing apparatus. The fluid being cooled is expelled from the interior of the tank of the degassing apparatus and collected in a suitable collection vessel.

During the cooling process, the fluid level within the tank of the degassing apparatus is monitored by a fluid level sensor to maintain selected levels, such as a substantially constant level, of fluid within the interior of the tank. The fluid level sensor is coupled to a degasser tank pressure valve. The pressure valve is used to maintain the gas pressure within the interior of the tank to maintain the desired fluid flow rate and fluid level in the interior of the tank. According to certain illustrative embodiments, the fluid level sensor may be coupled to the pressure valve on the exhaust gas outlet of the tank. The fluid level sensor detects and measures the level of fluid present within the interior of the tank of the degassing apparatus and controls the pressure valve on the exhaust gas outlet. For example, if the fluid (such as a sauce) level increases within the interior of the tank of the degasser to an undesirable level, the level sensor transmits a signal to the pressure control valve to begin to close in order to increase the gas pressure within the interior of the degasser tank, thereby increasing the fluid velocity and decreasing the fluid level.

According to alternative illustrative embodiments, the fluid level sensor may be coupled to a controller that is configured or programmed to receive an input signal from the fluid level sensor relating to the level of fluid present within the interior of the tank of the degassing apparatus to control the exhaust gas valve. The controller analyzes the input signals received from the fluid level sensor, and thereby transmits a control command to open or close the pressure control valve of the exhaust gas outlet of the tank.

Referring now to FIG. 1 there is shown a degassing apparatus 10 for use in an illustrative in-line cooling system for rapid cooling or chilling of fluids. The degassing apparatus 10 comprises a tank 12 having an interior 14 (a space or chamber) in which a headspace 16 is provided for cryogen gas generated during the in-line direct cryogenic cooling process. The tank 12 also has an inner surface 18 facing the center of the tank 12, and an outer or external surface 20 facing the external environment or atmosphere. The tank 12 includes a product inlet 22 that is located at an upstream end 24 of the tank 12. The tank 12 also includes a cryogen gas exhaust outlet 26 positioned at a downstream end 28 of the tank for exhausting or venting cryogen gas from the system and process. A substantially horizontally disposed product outlet 30 is in fluid communication with the interior 14 of the tank 12 and is configured for removing fluid from the interior 14.

Positioned within the interior 14 of the tank 12 of the degassing apparatus 10 and in-line with the fluid inlet 22 is a fluid flow surface 40. The fluid flow surface 40 is configured to decrease the velocity of the fluid flowing through the tank 12 so as to increase the residence time and expose more surface area of the fluid flowing within the interior 14 of the tank.

Figure 2A:
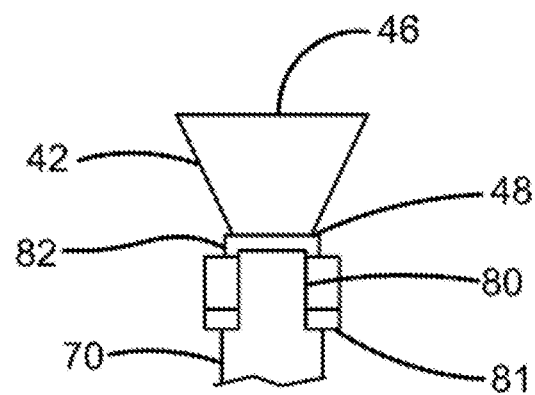
FIG. 2A is a side view of the cryogen injector coupled to the first frusto-conical fluid flow surface of the degassing apparatus.
Figure 2B:
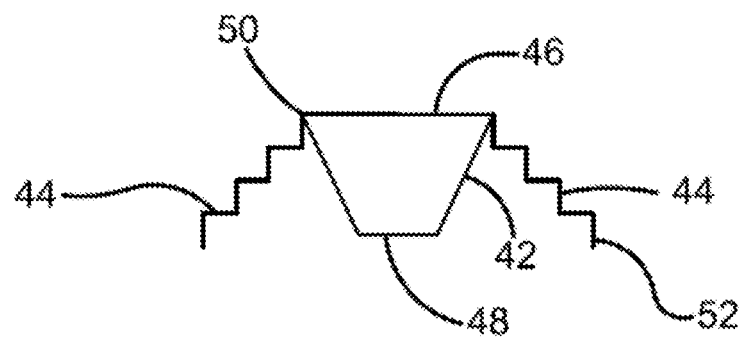
FIG. 2B is a side view of the fluid flow surface of the degassing apparatus comprising first frusto-conical fluid flow surface coupled to the second frusto-conical fluid flow surface.
Figure 2C:
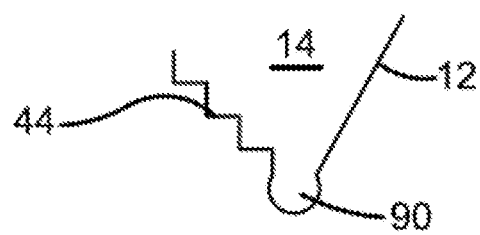
FIG. 2C is a fragmentary side view of the lower portion of the second frusto-conical fluid flow surface coupled with the fluid collector.

According to the illustrative embodiment shown in FIG. 1 and referring also to FIGS. 2A-2C, the fluid flow surface 40 comprises first 42 and second 44 frusto-conical surfaces The first frusto-conical surface 42 has opposed top 46 and bottom edges 48, and is inverted and extends upwardly and outwardly from the fluid inlet 22 of the tank 12. The second frusto-conical surface 44 has opposed top 50 and bottom 52 edges, and extends downwardly and outwardly from the top edge 46 of the first frusto-conical flow surface 42 toward the upstream end 24 of the tank 12. The second frusto-conical surface 44 of the fluid flow surface 40 is stepped along a portion of the surface 44 from the top edge 50 to the bottom edge 52 of the second frusto-conical surface 44.

A fluid collection trough 90 is positioned near or at the upstream end 24 of the tank 12 of the degassing apparatus 10 for collecting fluid flowing downwardly along the second frusto-conical fluid flow surface 44. The fluid collection trough 90 is positioned at or near the bottom edge 52 of the second frusto-conical surface 44 and is configured to collect the fluid flowing outwardly and downwardly along the second frusto-conical fluid flow surface 44.

FIG. 2A shows the coupling of a fluid pipeline 70 with the in-line cryogen injector and the first frusto-conical fluid flow surface 42 of the degassing apparatus 10. An end of the pipeline 70 is coupled to the inlet side 81 of the cryogen injector 80. The outlet side 82 of the cryogen injector 80 is directly coupled to the bottom edge 48 of the first frusto-conical fluid flow surface 42.

FIG. 2B shows the fluid flow surface 40 of the degassing apparatus 10 in isolation. The fluid flow surface 40 includes first 42 and second 44 frusto-conical surfaces. The first frusto-conical surface 42 has opposed top 46 and bottom 48 edges. The first frusto-conical surface 42 is inverted and extends upwardly and outwardly from the fluid inlet 22 of the tank 12. The second frusto-conical surface 44 has opposed top 50 and bottom 52 edges. The top edge 46 of the inverted first frusto-conical flow surface 42 is coupled to the top edge 50 of the second frusto-conical flow surface 44. The second frusto-conical surface 44 extends downwardly and outwardly from the top edge 46 of the first frusto-conical flow surface 42 toward the upstream end 24 of the tank 12.

FIG. 2C shows a fragmentary view of the second frusto-conical fluid flow surface 44 in fluid communication with fluid collection trough 90 located near the upstream end 24 of the tank 12 of the degassing apparatus 10.

Figure 3:
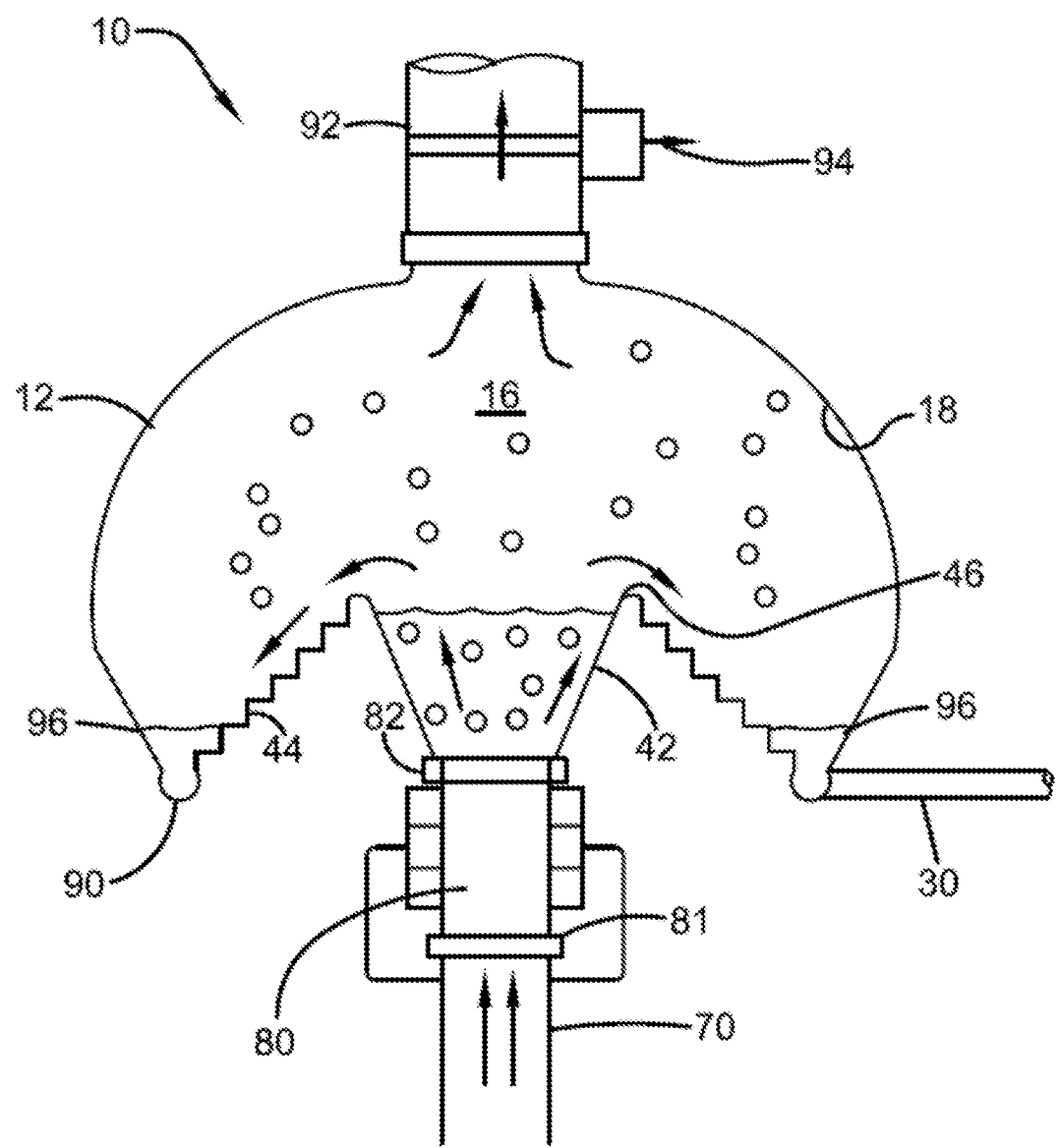
FIG. 3 is a cross section view of the degassing apparatus of FIG. 1.

FIG. 3 shows a cross section view of the illustrative embodiment of the degassing apparatus 10 of FIG. 1. Fluid to be cooled by the in-line cryogen cooling process flows into the interior 14 of the tank 12 of the degassing apparatus 10 through the pipeline 70. As mentioned above with respect to FIG. 1, the tank 12 includes the inner surface 18 facing the center of the tank 12, the outer surface 20 facing the external environment, the product inlet 22 located at the upstream end 24 of the tank 12, the cryogen gas exhaust outlet 26 positioned at the downstream end 28 of the tank for exhausting or venting cryogen gas from the system and process, and the substantially horizontally disposed product outlet 30 in fluid communication with the tank 12 and configured for flowing fluid product from the interior 14 of the tank 12 of the degassing apparatus 10.

Figure 4:
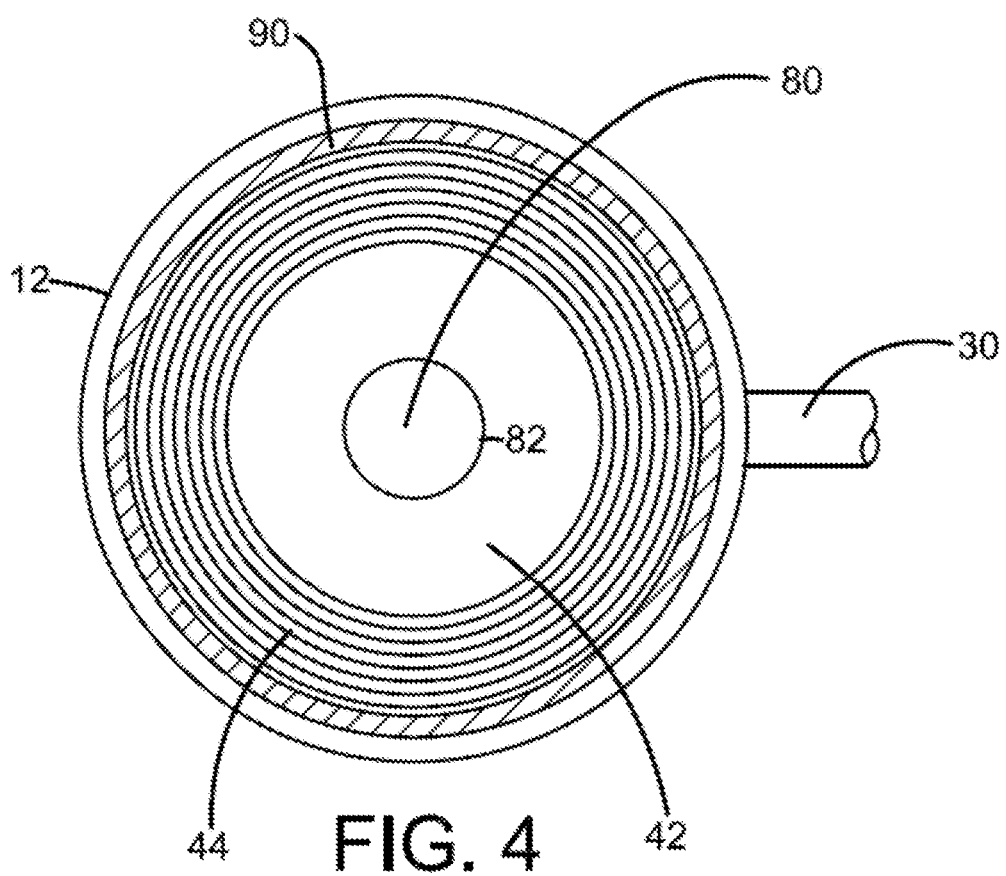
FIG. 4 is a top view of the interior of the tank of the degassing apparatus.

Referring also to FIG. 4 there is shown a top cross section view of the degassing apparatus 10, which includes the tank 12 having the interior 14. The outlet side 82 of cryogen injector 80 is shown centrally disposed in tank 12. The inverted first frusto-conical fluid flow surface 42 is coupled with the outlet side 82 of the cryogen injector 80 and extends upwardly and outwardly (so as to have an upwardly increasing diameter) from said injector into the interior 14 of the tank 12 where it terminates at the top edge 46 of the flow surface 42. The second frusto-conical fluid flow surface 44 extends downwardly and outwardly (so as to have a downwardly increasing diameter) from the top edge 46 of the first frusto-conical flow surface 42 until it couples with a substantially circular fluid collector 90 located at or near the upstream end 24 of the tank 12. The tank 12 also includes an exhaust gas outlet 92 located at the downstream end 28 of the tank 12. The exhaust gas outlet 92 is coupled to a back pressure valve 94 that is configured to open and close to control the gas pressure within the interior 14 of the tank of the degasser 10.

Still referring to FIG. 4, during the cryogenic fluid cooling process, fluid to be cooled, such as a sauce, flows into the cryogen injector 80 via fluid pipeline 70 where a suitable cryogen is injected directly into the fluid to be cooled. The mixture of the fluid and cryogen flow out through the outlet side 82 of the cryogen injector and into the tank 12 of the apparatus 10. The mixture of fluid and cryogen flows upwardly and outwardly along the inner surface of the inverted first frusto-conical fluid flow surface 42 until it reaches the top edge 46 of the surface 42. At the top surface 46 of the first flow surface 42 the flowing fluid changes direction and flows downwardly and outwardly along the outer surface of the stepped second frusto-conical fluid flow surface 44 and into the circular collection trough 90 located at the upstream end 24 of the tank 12. The cryogen gas generated by the cooling process and present in the headspace 16 of the tank 12 is exhausted from the system through the exhaust gas outlet 26.

Figure 5:
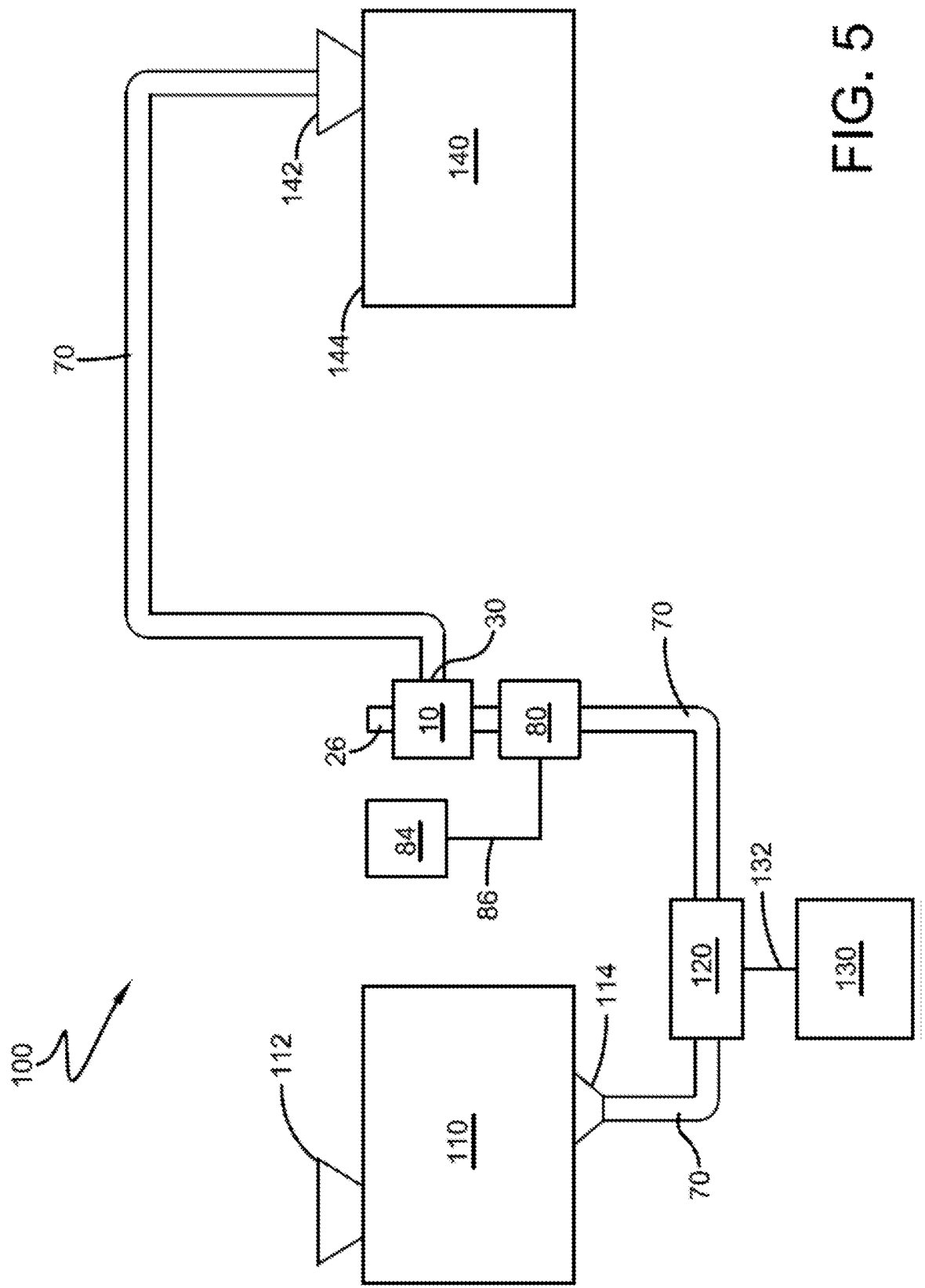
FIG. 5 is a schematic view of an illustrative in-line direct cryogenic cooling system incorporating the degassing apparatus.

FIG. 5 shows an illustrative embodiment of the direct in-line cryogen cooling system shown generally at 100. The in-line cooling system 100 comprises a cooking tank 110 for holding a quantity of food product, such as a heated sauce by way of example only, to be cooled by the system and method. The tank 110 comprises a food product inlet 112 for receiving a quantity or charge of the food product. The tank 110 also comprises a food product outlet 114 for releasing heated food product from the tank 110 into the pipeline 70 where the product will be cooled. The tank 110 is in fluid communication with pump 120 for conveying the heated food product from the tank through pipeline 70 to a cryogen injector 80. The pump 120 is positioned in-line with the pipeline 70. The pump 120 may be a positive displacement pump. The pump 120 is controlled by a mechanical and/or electrical controller 130, and is electrically coupled 132 to the controller 130.

Still referring to FIG. 5, the sauce flowing through the pipeline 70 is pumped by pump 120 through another length or segment of the pipeline 70 and through the cryogen injector 80 where the cryogen is directly injected into the flowing sauce. A source of cryogen 84 is in fluid communication with the cryogen injector 80 through a cryogen pipeline 86. The cryogen injector 80 is configured to inject the cryogen directly into the heated food product. The cryogen injector 80 is positioned in-line with pipe 70 and injects cryogen directly into the sauce, thereby eliminating the need for jackets or other external heat exchangers. The fluid flows from the outlet side 82 shown in FIG. 4 of the cryogen injector 80 and into the degassing apparatus 10 through fluid inlet 22 of FIG. 1. The fluid flows along the fluid flow surface (not shown in this FIG. 5) of the apparatus 10 such that cryogen gas generated is released from the fluid into the headspace 16 of the tank 12. The cryogen gas is exhausted from the degassing apparatus 10 through exhaust gas outlet 28. The cooled fluid is removed from the degassing apparatus 10 through the fluid product outlet 30 into the pipeline 70.

The in-line cooling system 100 also includes a collection tank 140. The collection tank 140 is configured to collect or otherwise receive cooled food product from the pipeline 70. The collection tank 140 is in fluid communication with pipeline 70 through food product inlet 142, and the tank 140 may also be provided with a lid 144 for sealing and accessing an interior of the tank.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. An apparatus for a cryogen fluid cooling system for liquid food product, comprising:
   a tank having an interior for receiving a fluid including liquid food product with a cryogen therein for the liquid food product to be degassed and cooled, a fluid inlet located at an upstream end of the tank, a fluid outlet, and an exhaust gas outlet which extends from a downstream end of the tank opposite the upstream end of the tank;
   a pressure control valve in communication with the interior of the tank and the exhaust gas outlet;
   a fluid level sensor in communication with the interior of the tank and the pressure control valve;
   a fluid flow surface positioned within the interior of the tank and configured to decrease the velocity of the fluid flowing through the tank, the fluid flow surface comprising:
      a first inverted frusto-conical surface having a first top edge and a first bottom edge opposed to the first top edge, wherein the first inverted frusto-conical surface extends upwardly and outwardly from the fluid inlet of the tank to decrease the velocity of the fluid, and
      a second frusto-conical surface having a second top edge and a second bottom edge opposed to the second top edge, the second top edge being coupled to the first top edge of the first inverted frusto-conical surface, wherein the second frusto-conical surface from being coupled extends downwardly and outwardly from the first top edge of the first inverted frusto-conical surface with steps constructed concentrically from the second top edge to the second bottom edge of the second frusto-conical surface to further decrease the velocity of the fluid; and a fluid collection trough positioned within the tank at and coupled to the second bottom edge of the second frusto-conical surface for receiving and collecting the liquid food product with reduced velocity.

2. The apparatus of claim 1, wherein the fluid outlet extends from the fluid collection trough of the tank.

3. The apparatus of claim 2, wherein the fluid level sensor is positioned between the fluid collection trough and the first and second top edges of the first inverted frusto-conical surface and the second frusto-conical fluid flow surface, respectively.

\* \* \* \* \*